(12) United States Patent
Schmid et al.

(10) Patent No.: US 8,727,051 B2
(45) Date of Patent: May 20, 2014

(54) HYBRID VEHICLE

(75) Inventors: Jochen Schmid, Sersheim (DE);
Stephan Hennings, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 292 days.

(21) Appl. No.: 13/014,089

(22) Filed: Jan. 26, 2011

(65) Prior Publication Data

US 2011/0192666 A1    Aug. 11, 2011

Related U.S. Application Data

(60) Provisional application No. 61/327,388, filed on Apr. 23, 2010.

(30) Foreign Application Priority Data

Feb. 5, 2010  (DE) .......................... 10 2010 007 632

(51) Int. Cl.
*B60K 1/04*      (2006.01)
*B60L 11/16*    (2006.01)

(52) U.S. Cl.
USPC ................ 180/65.31; 180/165; 180/65.22; 180/65.6; 180/65.21; 903/903

(58) Field of Classification Search
USPC ............. 180/65.31, 165, 65.22, 65.6, 65.21; 903/960; 280/217
See application file for complete search history.

(56) References Cited

U.S. PATENT DOCUMENTS

| 1,728,889 | A | * | 9/1929 | Kemble | 180/24.07 |
| 5,568,023 | A | * | 10/1996 | Grayer et al. | 318/139 |
| 5,829,542 | A | * | 11/1998 | Lutz | 180/65.6 |
| 6,073,712 | A | * | 6/2000 | Buglione | 180/65.245 |
| 7,048,087 | B2 | * | 5/2006 | Brill | 180/371 |
| 7,112,155 | B2 | * | 9/2006 | Keuth | 475/6 |
| 7,416,039 | B1 | * | 8/2008 | Anderson et al. | 180/165 |
| 7,935,014 | B2 | | 5/2011 | Bachmann | |

(Continued)

FOREIGN PATENT DOCUMENTS

| DE | 29518401 U1 * | 3/1997 |
| DE | 69402303 | 3/1997 |
| DE | 102007056302 | 5/2009 |
| JP | 2008037135 A * | 2/2008 |

*Primary Examiner* — J. Allen Shriver, III
*Assistant Examiner* — Steve Clemmons
(74) *Attorney, Agent, or Firm* — Gerald E. Hespos; Michael J. Porco; Matthew T. Hespos (57) ABSTRACT

A hybrid vehicle has a first drive apparatus for driving wheels on a first axle by an internal combustion engine and a second electrical drive apparatus with two electrical machines for driving wheels on a second axle. At least one electrical energy store can be discharged when the two electrical machines are operated as a motor and can be charged when the electrical machines are operated as a generator. The two electrical machines of the electrical drive apparatus are combined with a respectively associated gearbox in an electrical axle to drive the individually suspended wheels on the first axle via universally jointed shafts. Two electrical converters are associated respectively with the two electrical machines and are combined in one converter unit, such that a basic module has the mechanical link to a bodywork structure, the link to a cooling circuit and the electrical link to an electrical energy store.

10 Claims, 5 Drawing Sheets

(56) References Cited

U.S. PATENT DOCUMENTS

| | | | |
|---|---|---|---|
| 2005/0143210 A1* | 6/2005 | Hamai et al. | 475/150 |
| 2007/0158119 A1* | 7/2007 | Pascoe | 180/65.2 |
| 2008/0122228 A1* | 5/2008 | Liu et al. | 290/40 C |
| 2008/0164081 A1* | 7/2008 | Watanabe et al. | 180/65.2 |
| 2009/0242289 A1* | 10/2009 | Murty | 180/65.265 |
| 2010/0025126 A1* | 2/2010 | Nakatsu et al. | 180/65.1 |
| 2010/0108416 A1* | 5/2010 | Lind | 180/65.31 |
| 2010/0282528 A1* | 11/2010 | Palti | 180/65.1 |

* cited by examiner

HYBRID VEHICLE

CROSS-REFERENCE TO RELATED APPLICATIONS

This application claims priority under 35 USC 119 to German Patent Application No. 10 2010 007 632.5 filed on Feb. 5, 2010 and U.S. Provisional Patent Appl. No. 61/327,388 filed on Apr. 23, 2010, the entire disclosure of which is incorporated herein by reference.

BACKGROUND OF THE INVENTION

1. Field of the Invention

The invention relates to a hybrid vehicle.

2. Description of the Related Art

Hybrid vehicles require relatively large and voluminous electrical energy stores to carry an adequate amount of electrical energy. Therefore, the electrical energy stores generally are arranged physically separated from the electrical machines. However, this requires complex high-voltage wiring between the electrical energy store and the electrical machines.

The object of the invention is to provide a simplified hybrid vehicle.

SUMMARY OF THE INVENTION

The invention relates to a hybrid vehicle that has two electrical machines of an electrical drive apparatus combined with gearboxes associated with the respective electrical machines to define an electrical axle to form a common unit with the respective electrical machines driving individually suspended wheels via respective universally jointed shafts. Each electrical machine is associated with an electrical converter and the two electrical converters are combined in a common converter unit. The combination of the two electrical machines in a single electrical axle, and the two electrical converters in one converter unit, results in a simple arrangement for mounting these components in the hybrid vehicle. Furthermore, only a single high-voltage line is required to make electrical contact with the electrical energy store and the electrical converters.

The principle of operation of the hybrid vehicle of the invention is based on the interaction between an internal combustion engine and an electrical drive apparatus, which in this embodiment is a portal axle with two electrical machines. The components of this embodiment of the hybrid system are essentially a portal axle, an energy store, an electrical flywheel store, power electronics and a high-voltage cable.

The hybrid system of the invention allows recovery of braking energy that can be stored in the form of kinetic energy in an electrical flywheel store. When required, the driver can use this additional energy for temporarily driving the front axle, thus providing assistance to or a reduction in the load on the internal combustion engine. The intelligent factor here is that the temporary additional power does not increase the fuel consumption. On the contrary, the consumption can even be reduced, depending on the driving strategy, since the electrical drive power can be used as a substitute for a portion of the power of the internal combustion engine to achieve higher efficiency. By way of example, this is advantageous during acceleration or during starting of the hybrid vehicle. This aspect of the invention is particularly advantageous in a hybrid racing vehicle that takes part in a 24-hour race, since the winner is the one who completes the most laps.

The internal combustion engine may be arranged in the rear area of the hybrid vehicle and the second drive apparatus may be on the front axle. The second drive apparatus preferably is a so-called portal axle with two electrical machines that can operate as a generator when braking to produce electrical energy. For boosting, the driver can use this additional energy of the two electrical machines as an additional drive. The hybrid vehicle therefore temporarily has a four-wheel drive system, with traction advantages. The power from the internal combustion engine is transmitted through a gearbox, preferably a sequential 6-speed gearbox, on the rear axle, while the electrical machines apply their drive torque via a fixed gearbox step-down ratio to the front axle.

Other arrangements, of course, are also possible. For example, the internal combustion engine may be in the front area of the hybrid vehicle. In this case, the internal combustion engine can drive the rear axle and the electrical axle can be the front axle, or alternatively the internal combustion engine can drive the front axle and the electrical axle can be the rear axle.

The energy store in the hybrid system is an electrical flywheel that preferably is fixed to the bodywork adjacent to the driver. The energy store is an electrical machine that operates as a flywheel and accordingly has a rotor that stores the energy in the form of motion.

Current flows between the electrical machines and the flywheel store are controlled via power electronics elements. The interaction of the drive units, the internal combustion engine and the electrical machines is controlled via the hybrid manager (controller), which is superordinate to the motor controller. The hybrid manager receives all the essential system data to ensure optimum interaction of the overall system.

The strengths of the hybrid vehicle of the invention do not relate solely to the maximum power. Rather, the strengths relate to the advantageous combination of efficiency and performance whether driving in towns or when racing, such as in a 24-hour race. In fact, efficiency is a primary factor in a 24-hour race, since every pit stop to refuel costs valuable time. The performance advantages of the hybrid vehicle of the invention can be reflected in various racing situations.

The additional drive torque on the front axle is a considerable advantage during overtaking maneuvers on straight track sections or when accelerating out of turns. The temporary four-wheel drive system is particularly useful here due to traction advantages. The additional power does not increase the fuel consumption and can be produced completely by energy recovered during braking (recuperation). The hybrid vehicle of the invention also has driving programs that enable a reduced load on the internal combustion engine and therefore save fuel. An efficient driving program can save valuable fuel in dense traffic, such as in traffic jams or in a dense group of drivers when racing. The major strengths are electrical boost (additional torque) without additional fuel consumption, driving programs for a performance-oriented or efficiency-oriented operating strategy, traction advantages by temporary four-wheel drive (lap time potential in comparison to rear-wheel drive), improved weight balance between the front and rear axles because of the portal axle, comparatively low system complexity (inter alia no clutch, no actions required for gearbox and motor control), as well as weight and package advantages due to high-performance components.

The lower center of gravity utilized in the preferred embodiment of the hybrid vehicle is important for sports vehicles. The portal axle comprises two electrical machines connected to the respective wheels on the front axle via a multiple-disk clutch and a fixed gearbox step-down ratio. The current flow of the electrical machines is regulated by power electronics.

A portal axle with two permanent-magnet synchronous machines arranged alongside one another preferably is integrated directly in the front axle. The low center of gravity resulting from the installation position is of major advantage for driving dynamics. Each synchronous machine operates one wheel on the front axle. The electrical power of each machine may be in a range between 25 and 100 kW and preferably is about 60 kW to provide an additional maximum drive torque of about 150 Nm. The machines operate in the generator mode when the driver brakes. Energy recovered in this way is passed to the flywheel store via the high-voltage cable. Each electrical machine has a position sensor that determines the precise position of the rotor for optimum operation (magnetic-field position).

Forces are transmitted by hydraulic multiple-disk clutches to allow precise power transmission. The multiple-disk clutch is engaged permanently and is regulated automatically via the hybrid manager. By way of example, for safety reasons, the driver can disengage the clutches via a control unit to decouple the electrical machines from the drive train. A fixed gearbox step-down ratio reduces the high output rotation speed of the electrical machines of up to 15 000 revolutions per minute, and transmits the torques via the driveshafts to the wheel. The portal axle and the associated conversion unit have a separate low-temperature water cooling circuit, with a cooler positioned centrally in the front of the vehicle. The cooling channels are located in the housing of the portal axle.

The electrical flywheel store stores electrical energy recovered during braking in the form of kinetic energy. The store preferably is adjacent the front-seat passenger and comprises a safety housing, a stator and a rotor. Current flow is controlled by power electronics. The store is an electrical machine that operates with an external rotor as a flywheel. The stator is connected firmly to the housing, and the rotor is mounted to rotate freely about the stator. Electrical energy generated when the flywheel is being charged flows through the stator windings by recuperation, thereby producing a rotary movement by the interaction of the resultant electrical magnetic field in the stator with the permanent-magnet field of the rotor. The electrical energy is converted to kinetic energy. In this way, the rotating rotor stores the energy and outputs it again when required by changing the stator to the generator mode and converting the kinetic energy to electrical energy. During this process, the rotating magnetic field of the rotating rotor induces an electrical voltage in the stator winding and the electrical voltage is used as drive power by the two electrical machines on the portal axis. The rotor is braked by the forces acting on it.

The electrical flywheel has major advantages in comparison to other storage technology, such as rechargeable batteries. The advantages include a high efficiency of more than 90%, a high cycle life of more than 1 million cycles, a simple mechanical design and therefore less complexity, and a higher power density.

The power electronics for the hybrid vehicle of the invention comprise a converter unit that has one frequency converter (AC/DC converter) for each of the two electrical machines on the portal axle. Each converter regulates the current for one electrical machine. A second converter controls the electrical currents of the flywheel store. The frequency converters convert the alternating current generated during recuperation to direct current. Alternating current cannot be used directly to operate the electrical flywheel since the rotation-speed differences between the electrical machines and the flywheel lead to frequency differences, and therefore to fluctuations in the electrical voltages. This is exacerbated in a negative form by the time component since, in this case, different voltage peaks are produced in the time profile of the braking process. Rectification therefore is required to enable use of the currents that are generated. A direct-current intermediate circuit connects the converter unit of the flywheel to that of the portal axle. This direct-current intermediate circuit levels out the voltage level and results in a constant electric current.

The electric currents in the hybrid system are passed via a special high-voltage cable. In addition to the three-phase cables for operation of the electrical machines and the flywheel store, there is a single cable connection that represents the DC voltage intermediate circuit.

The cockpit of the hybrid vehicle preferably has hybrid-specific control elements that make it easier for the driver to use the system effectively. These control units are the boost button on the steering wheel to call up the additional electrical drive torque, the state of charge of the flywheel store, the LED indication boost recommendation, a map switch for calling up specific driving programs, and a hybrid-off switch.

An indication in the combination instrument (LCD) preferably informs the driver of the percentage value of the state of charge of the flywheel store (value from 0-100%). The maximum boost duration preferably is between 5 and 20 second, and most preferably about 10-12 seconds. The driver may receive a boost recommendation via an LED light accommodated in the combination instrument. The light signals the driver when the boost functionality can be used, should be used from the energy point of view, or is not available. A so-called map switch (latching switch) also may be fit to the steering wheel and allows driving programs matched to a specific operating or racing strategy. The switch may have plural functions, for example 10. Possible functions include, inter alia, an "efficient mode", which allows driving as efficiently as possible, with little fuel consumption and reduced power. Parameters such as the gas-pedal characteristics and switching-point indications are appropriately adapted for this purpose. When the load point is reduced, the desired power can be compensated for by the internal combustion engine, which is assisted by the electrical drive.

The center console may have a further hybrid-specific control unit, such as a hybrid-off switch. In the basic position, the hybrid drive is active. The driver has the capability to deactivate the hybrid drive via two stages, specifically a hybrid system "soft off" with restricted functionality for boosting and for recuperation, as well as a hybrid system "hard off", where the multiple-disk clutch to the portal axle is disengaged, and the electrical machines are decoupled from the drive train. Furthermore, important characteristic and diagnostic values are indicated to the driver on the LCD display and are evaluated continuously by the hybrid manager. The driver can adapt the driving strategy on the basis of power and temperature data of the drive.

A portion of the braking energy can be recovered during recuperation and can be made used again for the drive. In addition to the hydraulic braking system, the electrical machines on the portal axle also control a portion of the braking power in the generator mode. The two electrical machines use the mechanical kinetic energy of the front axle driveshafts of the hybrid vehicle that is being driven with the rotating rotor to produce an electrical voltage in the stator windings. As electrical energy, the voltage drives the electrical flywheel store, which in turn stores the energy as kinetic energy.

The extent of the deceleration demand of the driver is sensed via the brake pedal and also is included as a parameter in the operating strategy to produce a braking torque in the electrical machine. The braking power therefore results from a superimposition of the mechanical braking installation and the generator power of the electrical machines. The procedure for the energy flow during boosting is as follows:

1) driver brakes and electrical machines in the portal axle operate in the generator mode
2) generator mode produces an additional braking torque on the front axle
3) portions of the braking energy are recovered and converted to electrical energy
4) the electrical energy obtained is used to produce motion in the flywheel, and to store energy in the motion.

The major advantages of braking energy recovery (recuperation) are recovery of a portion of the braking energy that is normally lost, additional braking power because of the electrical machines, and conservation of the mechanical braking installation.

The internal combustion engine is the primary drive in the hybrid vehicle of the invention, but additional electrical drive torque is output to the front wheels on boosting in certain driving situations. The boost function can be used briefly and very spontaneously with maximum power on straight track sections, while the additional torque can be applied more continuously when turning with higher lateral acceleration. The boost function is restricted automatically if certain limit values are exceeded, such as excessive lateral acceleration or excessively low state of charge of the flywheel store. The hybrid manager continuously analyzes all vehicle driving characteristics, such as the rotation speed, the steering angle and the longitudinal and lateral acceleration to allow the boost function to be used. Furthermore, the state of charge of the flywheel store is monitored continuously. The hybrid manager illuminates the LED light in the combination instrument to signal to the driver the system readiness and the availability of the additional power. The hybrid vehicle temporarily uses four-wheel drive during boosting.

Traction advantages are obtained when accelerating out of turns. As an alternative to power-oriented boosting, the temporary electrical additional torque also can be used to reduce the load on the internal combustion engine by a specific driving program. This allows valuable distances to be traveled and fuel to be saved in a 24-hour race. The energy flow procedure during boosting is as follows:

1) driver presses the boost button on the steering wheel
2) rotating flywheel is braked and in the process produces electrical energy in the generator mode
3) electrical energy drives the two electrical machines in the portal axis, and is used as additional drive power on the front axle The major advantages of the additional electrical drive torque during boosting are an additional drive torque for more acceleration, a spontaneous power demand via the boost button for more dynamics, improved traction by temporary four-wheel drive, no additional fuel consumption, no additional emissions, and use of additional drive torque to reduce the load on the internal combustion engine and to reduce the fuel consumption.

Advantageous refinements and developments of the invention will become evident from the description, with reference to the drawings.

The invention will be explained in more detail in the following text with reference to the exemplary embodiments which are indicated in the figures of the drawing.

DETAILED DESCRIPTION OF THE PREFERRED EMBODIMENTS

Elements and apparatuses which are the same or functionally the same have been provided with the same reference symbols in all the figures, unless stated otherwise.

Figure 1:
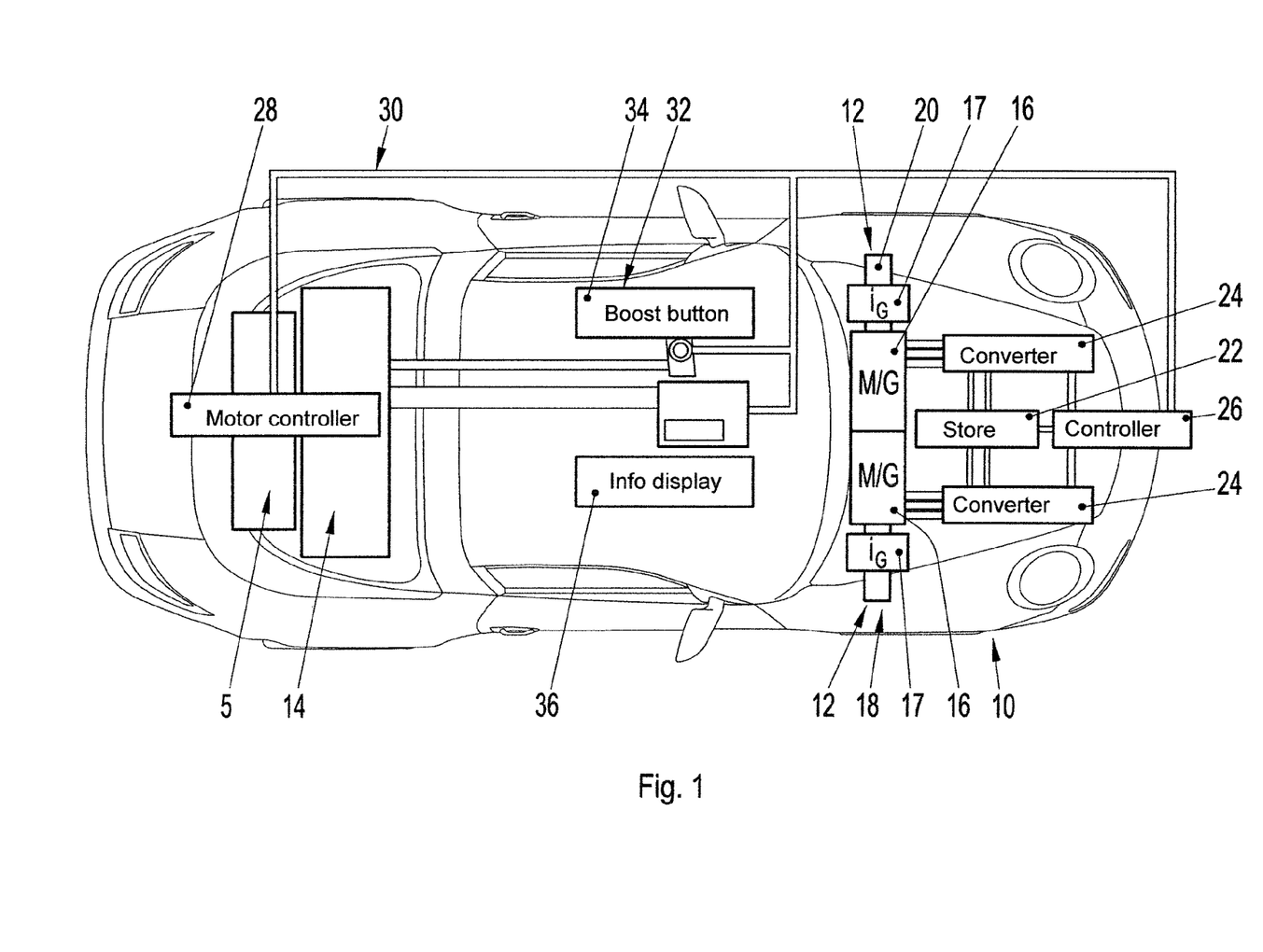
FIG. 1 is a schematic plan view of a hybrid vehicle according to the invention.

FIG. 1 illustrates a purely schematic and highly simplified plan view of a hybrid vehicle 10 with a first drive apparatus for driving the wheels on a first axle by means of an internal combustion engine, as well as a second electrical drive apparatus for driving the wheels on a second axle, according to one embodiment of the invention.

As is shown in FIG. 1, the hybrid vehicle 10 has an internal combustion engine 14, for example a petrol engine. In this case, by way of example, the internal combustion engine 14 is arranged in the rear area of the hybrid vehicle 10, as is illustrated in FIG. 1, and drives the two wheels (not illustrated) on a first axle, for example the rear axle here, via a first axle drive apparatus 5.

The hybrid vehicle 10 has a second electrical drive apparatus 12 that drives the two wheels on the second axle, in this case the front axle 20, of the hybrid vehicle 10. The second electrical drive apparatus 12 has two electrical machines 16 that respectively drive the wheels (See FIG. 3) on the front axle 20. The electrical machines 16 in this case are separate from one another, and drive the two wheels independently of one another.

As is shown in FIG. 1, the two separate electrical machines 16 of the electrical axle 20, or the front axle 20 in this case, of the second electrical drive apparatus 12 drive the respectively associated wheels via respective spur-gear stages 17 and respective universally jointed shafts 18. An electrical energy store 22, for example a high-voltage battery or a flywheel store, is provided to supply electrical energy to the electrical machines 16. However, the invention is not restricted to these two examples for electrical energy stores 22. In principle, any other type of electrical energy store 22 or combination of electrical energy stores 22 can be provided to supply the necessary electrical energy to the electrical machines 16.

Furthermore, the electrical energy store 22 is connected to a converter unit 24. The converter unit 24 in this case converts the direct current from the electrical energy store 22 to an alternating current for the respective electrical machine 16 so that the electrical machines 16 can drive the associated wheel on the electrical axle 20 as required. The drive for the two wheels in this case can be controlled via an appropriate control apparatus 26 or a hybrid control apparatus. The control apparatus 26 is connected to the electrical energy store 22, to the converter unit 24 and to the two electrical machines 16. As shown in FIG. 1, the control apparatus 26 can be coupled to a motor control apparatus 28, or can be connected via a bus system 30, such as a CAN bus system, or alternatively may also be in the form of part of the motor control apparatus 28 (not illustrated). In this case, the internal combustion engine 14 and the first drive apparatus 5 are controlled via the motor control apparatus 28 to drive the rear axle.

The control apparatus 26 and/or the motor control apparatus 28 also may be connected, as is shown in FIG. 1, to at least one input apparatus 32, for example a boost button 34, and/or to a display apparatus 36. The driver of the hybrid vehicle 10 can use the input apparatus 32 to make an input that to operate the hybrid vehicle 10 in a predetermined operating mode. For example, an operating mode suitable for four-wheel drive or for boost operation can be preset as one such operating mode.

By way of example, one such operating mode is an acceleration mode in which the driver can accelerate his hybrid vehicle 10 out of a turn. If the driver uses the input device 32 to select the acceleration mode, the hybrid vehicle 10 is driven via a four-wheel drive via both axles rather than only via the rear axle. In the four-wheel drive mode, the second axle, for example the front axle 20 here, additionally can be driven via the second electrical drive apparatus 12, thus providing a four-wheel drive mode. For this purpose, the front axle 20 and the two front wheels 18 additionally are driven via the second electrical drive apparatus 12 and its two electrical machines 16.

The selected operating mode additionally can be indicated on the display apparatus 36, and/or a selection of suitable operating modes can be indicated, from which the driver can select. The display apparatus 36 optionally can be an input apparatus (not illustrated) and may have a touchscreen for inputting or clicking on a desired operating mode in which the hybrid vehicle 10 is operated in a four-wheel drive mode.

As described above, the hybrid vehicle 10 can be operated both in a two-wheel drive mode and in a four-wheel drive mode. In this example, the rear wheels are operated via the internal combustion engine 14 in the two-wheel drive mode and the front wheels 18 also are operated via associated electrical machines 16 in the four-wheel drive mode. In this case, the electrical machines 16 are fed with energy from the electrical energy store 22, which is charged or fed via the electrical machines 16 on the electrical axle 20 being operated as generators. The electrical energy store 22 can be charged exclusively via one or both electrical machines 16, or the electrical energy store 22 can be fed with electrical energy via at least one further power supply source, such as a stationary electrical power supply system, for example a refueling point with an electrical connection.

Figure 2:
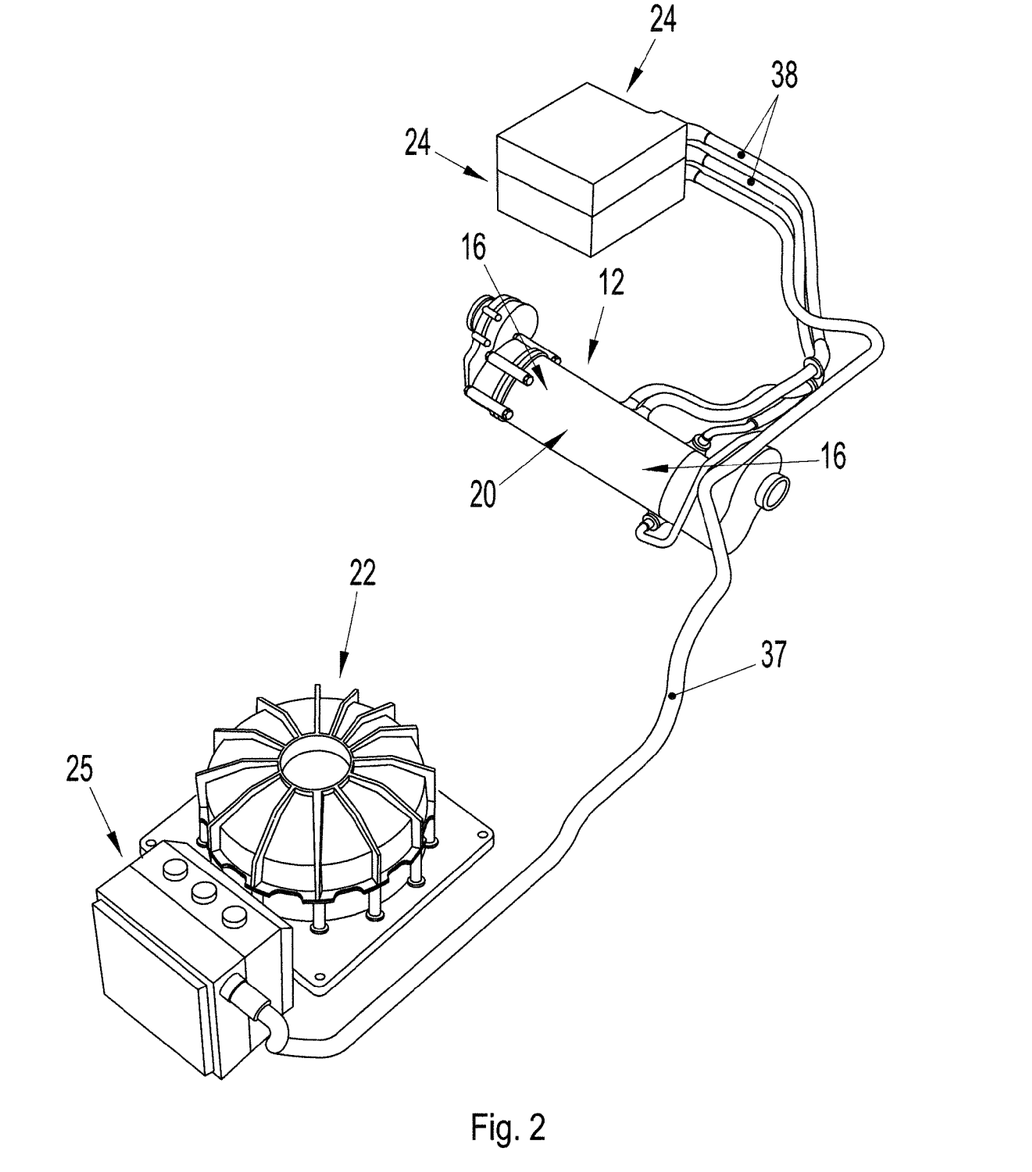
FIG. 2 is a perspective view of a second electrical drive apparatus according to the invention.

FIG. 2 is a perspective view of one example of the second electrical drive apparatus 12 for the hybrid vehicle 10 according to the invention. As described above, the second electrical drive apparatus 12 has two electrical machines 16 for driving the wheels on a vehicle axle 20, for example the rear axle or the front axle 20, which can in each case drive an associated wheel on the axle. The respective electrical machine 16 is connected to an associated electrical converter in the converter unit 24 via two line apparatuses 38, for example two high-voltage cables. A further electrical converter 25 is connected via a line apparatus 37, for example a high-voltage cable, to an electrical energy store 22, for example a flywheel store apparatus 22 as shown in FIG. 2.

A control apparatus or hybrid control apparatus is provided in order to control the two electrical machines 16. This apparatus is connected to electrical converters in the converter unit 24 via a respective line apparatus, see FIG. 1, and via a line apparatus to the electrical energy store 22. The control apparatus also is connected to the motor control apparatus, for example via a bus system, such as a CAN bus system as shown in FIG. 1.

Figure 3:
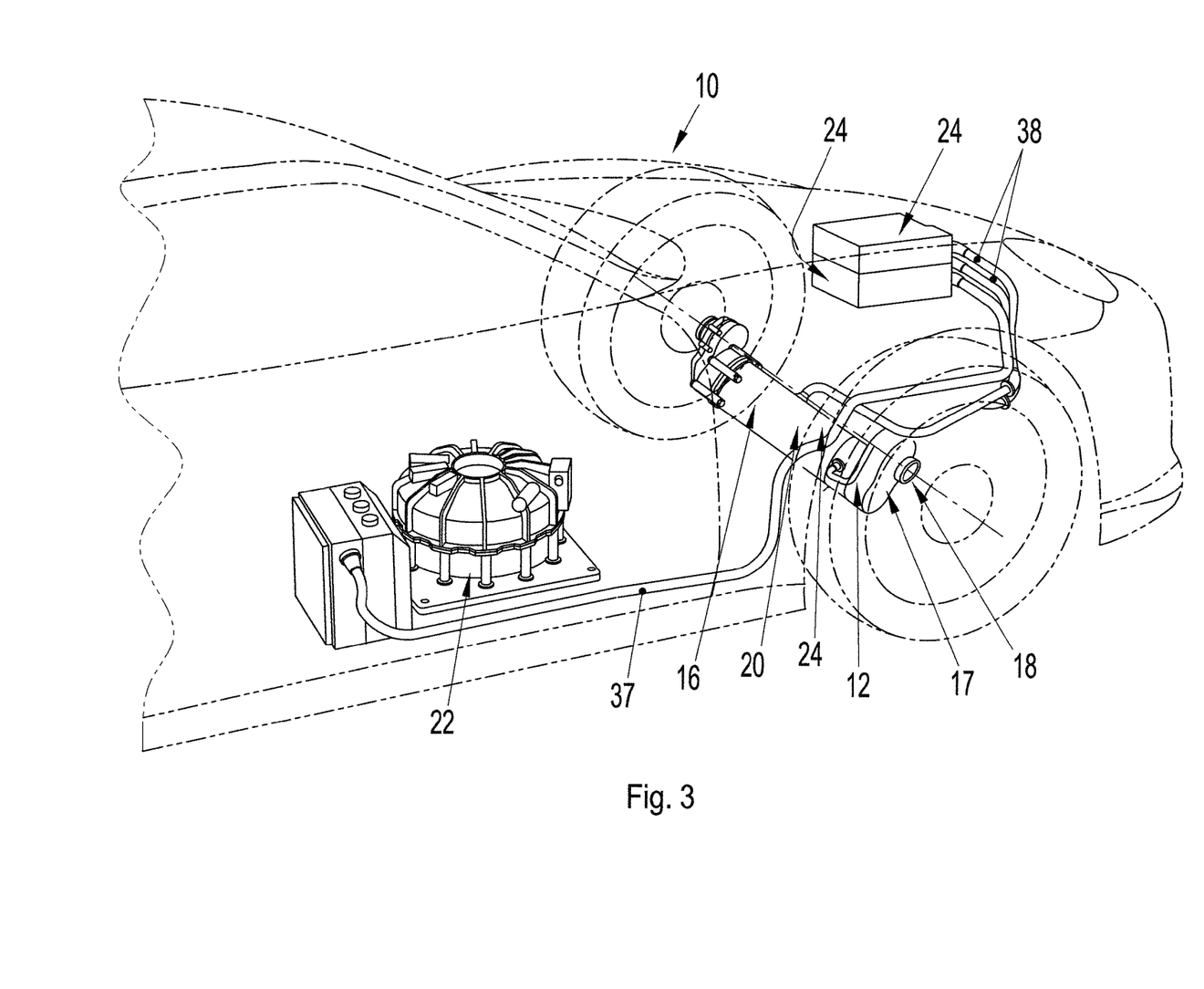
FIG. 3 is a perspective view of a hybrid vehicle illustrated in a transparent form with a second electrical drive apparatus as shown in FIG. 2 installed.

FIG. 3 shows an example of the second electrical drive apparatus 12 of FIG. 2 in a hybrid vehicle. As shown in FIG. 3, the second electrical drive apparatus 12 is intended to drive both wheels on the first axle 20, and therefore the electrical machines 16 are arranged on the front axle 20 and its front wheels 18. The converter unit 24 also is arranged at the front in the hybrid vehicle 10 near the electrical machines 16 or the electrical axle 20. The converter unit 24, however, also could be arranged at any other desired location in the hybrid vehicle 10, provided it is connected to the electrical machines 16 to provide them with the necessary electrical energy. The electrical energy store 22 may be a flywheel store. In the example illustrated in FIG. 3, the electrical energy store 22 is in the central area of the hybrid vehicle 10, namely in the area of the passenger compartment of the hybrid vehicle 10. However, the electrical energy store 22 may be at any other location in the vehicle 10, for example near the front axle 20, near the rear axle of the hybrid vehicle 10 or in the spare wheel trough. Alternatively, two flywheels that are coupled electrically to one another may be provided as an electrical store in the area of the rear-seat of the hybrid vehicle 10. In this case, the electrical energy store 22 is connected via a line apparatus 37 to the associated electrical converter 25, and the electrical machines 26 are connected to the converter unit 24 via two line apparatuses 38.

Figure 4:
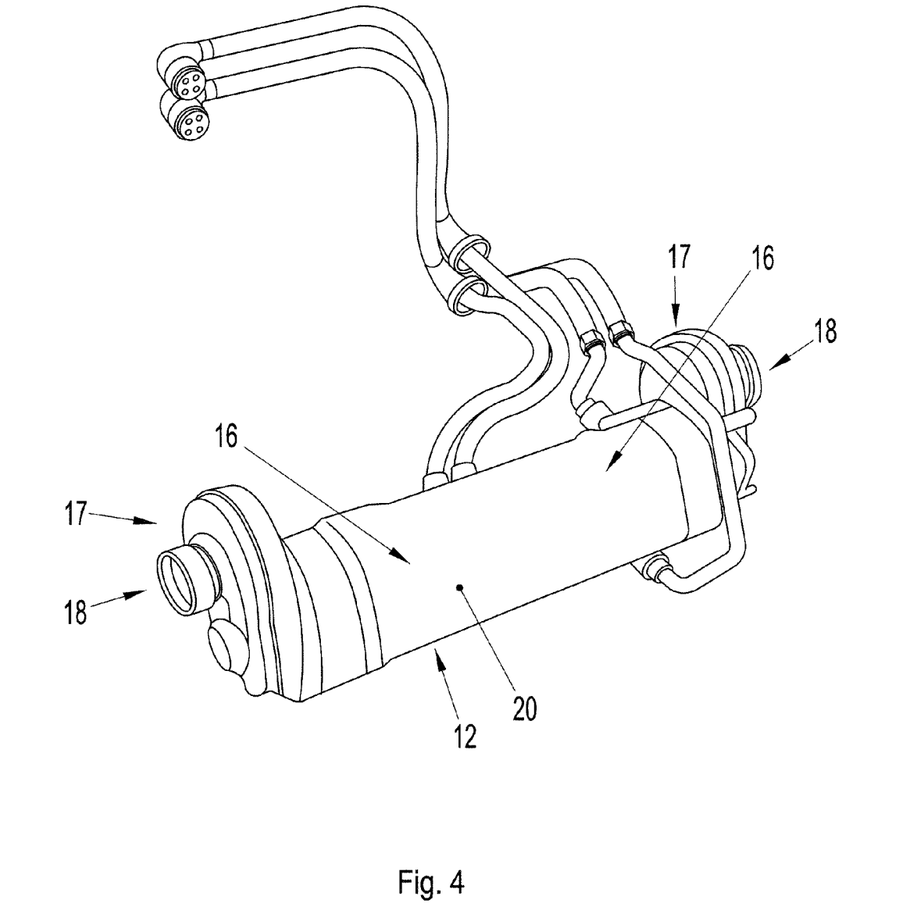
FIG. 4 is a detail of a perspective view of a second electrical drive apparatus of FIGS. 2, 3.

FIG. 4 shows a detail of the second electrical drive apparatus 12 of the invention. As described above, the second electrical drive apparatus 12 has the axle 20 with the two electrical machines 16 for driving the two wheels on the axle 20, as well as the associated electrical converters in the converter unit 24. In this case, two line apparatuses 38 are shown for connecting the electrical machines 16 to the electrical converters. The electrical machines 16 drive the associated wheel via a respective spur-gear stage 17 and a respective universally jointed shaft 18. The converter unit 24 in this case is arranged in a housing, as is shown in FIG. 5.

Figure 5:
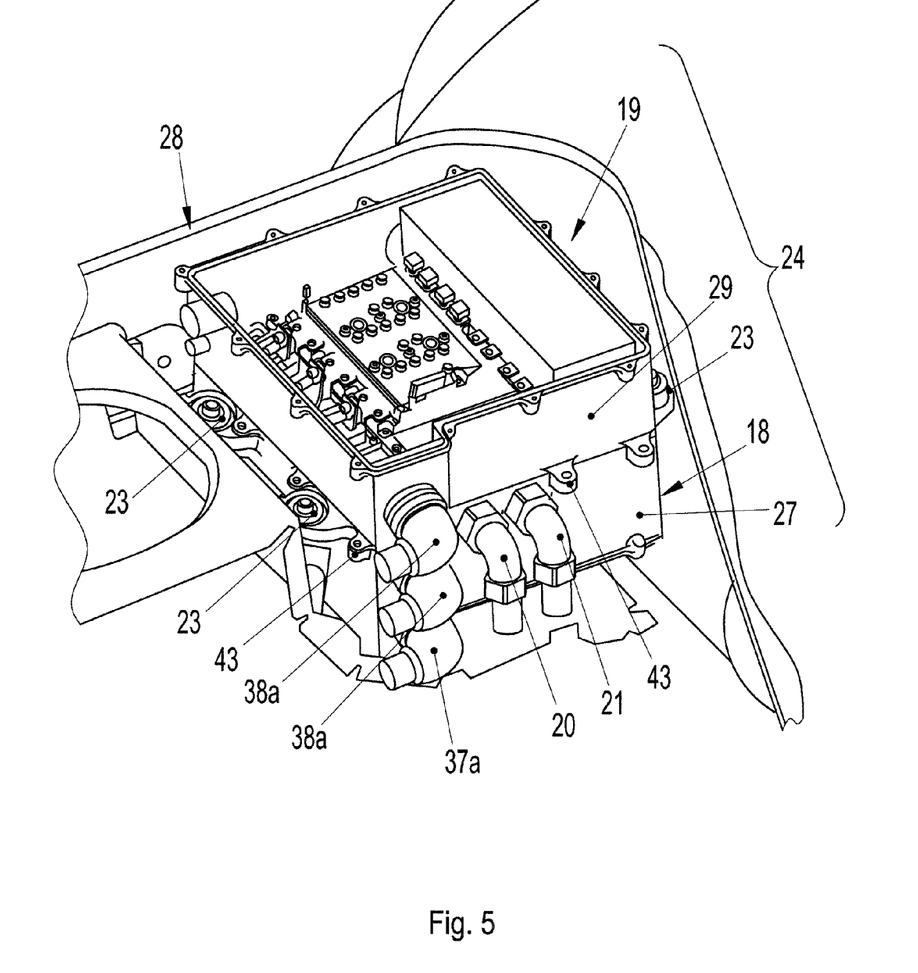
FIG. 5 is a perspective view from above of a converter unit for a second electrical drive apparatus according to the invention.

FIG. 5 shows the converter unit 24 that is connected to the two electrical machines 16 via two line apparatuses 38 and that is connected to the electrical energy store 22 via a further line apparatus 37. The converter unit 24 has a basic module 18 and an additional module 19 coupled to the basic module 18. The basic module 18 comprises an electrical converter that interacts with one of the electrical machines 16 and the additional module 19 comprises an electrical converter that interacts with the other electrical machine 16.

The basic module 18 also has connections 21a, 21b for cooling the converter unit 24. The connection 21a is a feed for coolant and the connection 21b is a return. The converter unit 24 can be included in a coolant circuit, and can be cooled via the connections 21a, 21b for coolant. The basic module 27 of the converter unit 24 also has a connection 37a for making electrical contact via a line apparatus 37 with the converter 25 associated with the electrical energy store 22. The basic module 27 of the converter unit 24 furthermore has a connection 38a for making electrical contact via a line apparatus 38 with the electrical machine 16 that interacts with the electrical converter in the basic module 27. Furthermore, the basic module 27 of the converter unit 24 has attachment means 23, via which the converter unit 24 can be connected mechanically connected to the bodywork structure 28 of the hybrid vehicle 10.

As already mentioned, the additional module 19 that can be coupled to the basic module 18 has the electrical converter that interacts with the other electrical machine 16, as well as a connection 38a for making electrical contact via a line apparatus 38 with the electrical converter in the additional module 19, to the other electrical machine 16. The additional module 19 in the converter unit 24 can be linked mechanically to the bodywork structure 28 via the basic module 18. Furthermore, the additional module 19 can be cooled via the basic module 18. In addition, the electrical converter in the additional module 19 and interacts with the other electrical machine 16 can be coupled via the basic module 18 to the converter 25 for the electrical energy store 22.

Projections on the housing 27 of the basic module 18 engage in depressions (not shown) in the housing 29 of the additional module 19 when the basic module 18 and the additional module 19 are coupled. The housings 27, 29 can be screwed to one another via attachment sections 43 formed on them.

A further or third electrical machine may be provided and may be associated with the first drive apparatus. This third electrical machine allows at least one additional electrical drive for the wheels of the first axle, which is driven by the internal combustion engine 14. Depending on the configuration, the wheels on the first axle then can be driven solely by the internal combustion engine 14, jointly by the internal combustion engine 14 and the third electrical machine, or even solely by the third electrical machine. In this case, the third electrical machine can be operated as a generator and/or as a motor. When the third electrical machine is in the generator mode, the electrical energy store 22 and/or the electrical machines 16 can be supplied with electrical energy.

What is claimed is:

1. A hybrid racing vehicle, comprising a first drive apparatus for driving wheels on a rear axle by an internal combustion engine, and a second drive apparatus having two electrical machines for driving individually suspended wheels on a front axle, and at least one electrical energy store having at least one flywheel store that can be discharged when at least one of electrical machines is operated as a motor and can be charged when at least one of the electrical machines is operated as a generator, the flywheel store being within the passenger compartment of the vehicle, the two electrical machines of the second drive apparatus being combined with a respectively associated gearbox in an electrical axle to drive the wheels on the front axle via a respective universally jointed shaft, the front axle being a portal axle with axes of the electrical machines being lower than rotational axes of the wheels on the front axle, and two electrical converters associated respectively with the two electrical machines and being combined in one converter unit forward of the front axle.

2. The hybrid vehicle of claim 1, wherein the converter unit is designed such that a basic module comprises a mechanical link to a bodywork structure, the link to a cooling circuit and the electrical link to an electrical energy store.

3. The hybrid vehicle of claim 1, wherein a flywheel store is in a central area of the hybrid vehicle.

4. The hybrid vehicle of claim 3, wherein the flywheel store is in an area of a front-passenger seat.

5. The hybrid vehicle of claim 3, wherein the flywheel store is in an area of a rear-seat installation.

6. The hybrid vehicle of claim 1, wherein the first drive apparatus is associated with a third electrical machine for selectively driving the wheels on the rear axle on their own electrically or together with the internal combustion engine.

7. The hybrid vehicle of claim 6, wherein the third electrical machine is arranged on a shaft for driving the rear axle by the internal combustion engine.

8. A hybrid racing vehicle, comprising:
an internal combustion engine disposed in a rear part of the hybrid vehicle for driving wheels on a rear axle; and
a second drive apparatus including an electrical axle having left and right electrical machines combined respectively with left and right gearboxes for driving left and right individually suspended wheels on a front axle via respective left and right universally jointed shafts, the front axle being a portal axle with axes of the electrical machines being lower than rotational axes of the wheels on the front axle, the second drive apparatus further having left and right electrical converters combined in one converter unit forward of the front axle and associated respectively with the left and right electrical machines and at least one flywheel store that can be discharged when at least one of electrical machines is operated as a motor and can be charged when at least one of the electrical machines is operated as a generator, the flywheel store being within the passenger compartment of the vehicle.

9. The hybrid vehicle of claim 8, wherein the flywheel store is in a central area of the hybrid vehicle.

10. The hybrid vehicle of claim 9, wherein the flywheel store is in an area of a front-passenger seat.

* * * * *